May 16, 1944.   J. W. WATSON   2,348,942
LEAF SPRING WITH FRICTION ELEMENT
Original Filed Sept. 15, 1938
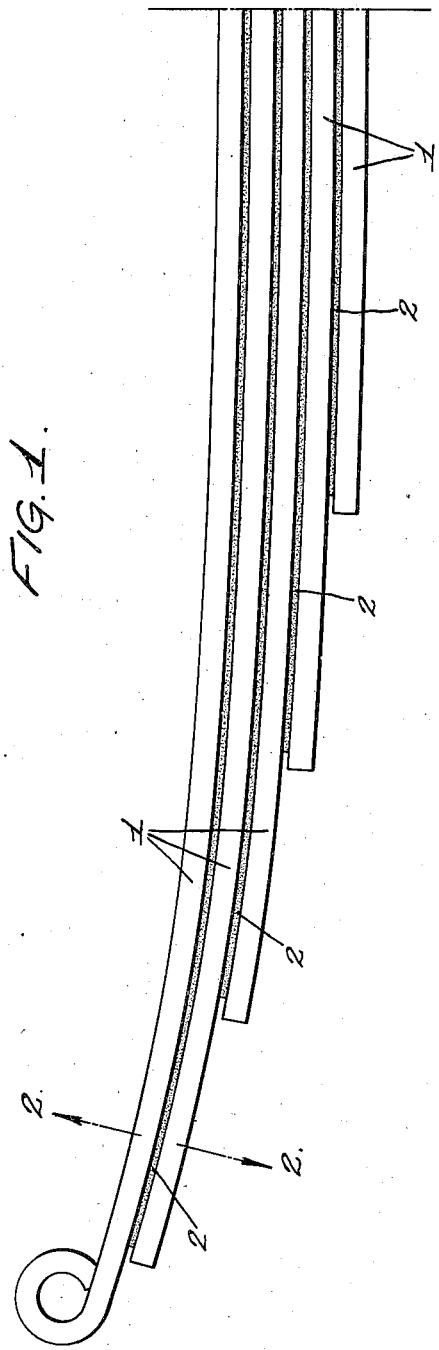
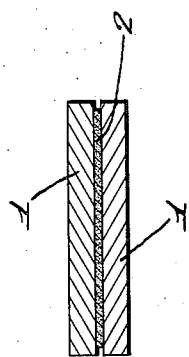
Inventor:
John Warren Watson
by his Attorneys
Howson & Howson Patented May 16, 1944

2,348,942

UNITED STATES PATENT OFFICE 2,348,942

LEAF SPRING WITH FRICTION ELEMENT

John Warren Watson, Wayne, Pa., assignor to John Warren Watson Company, Philadelphia, Pa., a corporation of Pennsylvania Original application September 15, 1938, Serial No. 230,156. Divided and this application August 22, 1941, Serial No. 407,972

3 Claims. (Cl. 267—50)

This application is a division of my application Serial No. 230,156, filed September 15, 1938.

This invention relates to a structure for use between two relatively movable elements such as spring leaves for damping, controlling, or regulating their relative movements.

A particular object of this invention is to provide a structure which shall possess a uniform coefficient of friction throughout its thickness in order to insure uniformity of the aforesaid control or regulation regardless of the extent to which the structure may be worn.

A further object of the invention is to provide a structure with sufficient strength and toughness to satisfactorily withstand, without objectionable fray or distortion, the loads and pressures imposed in service.

A further object of the invention is to provide a structure which is highly resistant to wear.

A further object of the invention is to provide a structure which possesses sufficient flexibility to permit substantial bending without fracture.

A further object of the invention is to provide a structure which will satisfactorily withstand the action of water and/or oil to which it may be subjected in service.

A further object of the invention is to provide a structure exhibiting substantial equality between static and dynamic coefficients of friction to avoid producing spasmodic actions, vibrations and noises to the extent of being audible or objectionable.

In the attached drawing:

Fig. 1 is a fragmentary side elevation of a leaf spring equipped with impregnated spacing devices made in accordance with my invention, and Fig. 2 is a section on the line 2—2, Fig. 1.

In the drawing, the leaves of the spring are designated by the reference numeral 1; and 2 designates the impregnated spacing devices inserted between and separating the leaves.

In the production of certain structures for regulating movements between relatively movable parts, it has been proposed to apply coatings to stiff paper-board or the like, the coatings providing the required frictional or anti-frictional qualities, and the board or base being relied upon to provide the necessary strength and toughness. Such a structure, however, does not provide the very important element of uniformity, throughout, in the matter of coefficient of friction.

To provide the above uniformity, throughout, it is necessary to start with a material which is suitable to act as a matrix and not merely as a carrier. To be thus suitably porous, the matrix, in itself, will possess little strength. The required strength and toughness, therefore, must result from the combined structure consisting of the matrix and a suitable impregnating compound.

In order to provide uniformity throughout, and in order to provide resistance to the action of water and/or oil, the matrix must be sufficiently porous and the impregnating compound must possess sufficiently low surface tension to insure that impregnation will be very complete.

In carrying out this invention, I have obtained excellent results, in the matter of the matrix, by using variously compounded kraft papers, and I have found outstanding merit in a kraft paper embodying a small percentage of kapok fibre. Such a paper is manufactured by the Seaman Paper Company under the trade name "Seapak."

Many compounds may be found suitable for imparting to the above or to similar matrices the combination of requirements which have been stated above as the objects of this invention. I have obtained very excellent results by the use of two well known synthetic waxes now on the market, either singly or combined and/or in combination with other materials or compounds, varying their proportions or use according to the requirements of any particular duty.

One of these waxes may be designated as "approximately a hexa chlornaphthalene." Chlorinated naphthalene synthetic waxes are made by reacting naphthalene with chlorine. The chlorination is allowed to continue until a material is obtained containing approximately 62% chlorine. This chlorine content corresponds to approximately a hexa chlornaphthalene, although the commercial product as made for example by the Halowax Corporation and marketed under the trade name "Halowax," undoubtedly contains some chlorinated derivatives such as the septa and penta chlor.

The other of the synthetic waxes which I have found to be suitable in carrying out the invention is "hydroxy stearin" which is comprised principally of 12-hydroxy stearin (glyceryl trihydroxystearate) produced by the catalytic hydrogenation of castor oil and which is marketed for example by the du Pont Company under the trade name "Opal Wax."

Of these two synthetic waxes, the first mentioned has the higher melting point, the higher coefficient of friction and the greater toughness. The second mentioned wax has the greater hardness and is of relatively lower specific gravity. By combining the two waxes in various proportions, it will be apparent that various degrees of toughness, hardness, coefficient of friction, melting point or specific gravity may be obtained. As both of these waxes, at the present market, cost about the same by weight, lower cost, by volume, may be had by each proportional increase of the second wax. In addition to thus lowering the cost, the addition of the second wax has also been found to produce a smoother action than is produced by the first wax alone. In other words, a very satisfactory equalization of the static and dynamic coefficients of friction is obtained.

To get the desired compromise between toughness, hardness, coefficient of friction, melting point, cost per volume and smoothness of action, these two waxes, by melting, can be combined in any desired proportions, one with the other. Experimentation will show which wax by itself or what relative proportions of the two will best meet the requirements of any particular duty.

When used for impregnating matrices of a fibrous nature such as the papers above described, I maintain either of these waxes or any combination of them at a melting temperature of approximately 320° Fahrenheit. The impregnation may be accomplished by simple immersion of the matrix. The length of time of immersion to obtain satisfactory impregnation will vary according to the porosity of the matrix, the thickness of section and the moisture content. A preheating of a matrix to evaporate moisture may be found advisable in certain instances.

In using any combination of these two waxes, agitation should be constantly maintained during the mixing and impregnating period because of the great difference in the specific gravity of these two waxes.

The exceptionally good waterproofing and oilproofing properties of both of these waxes is of great importance as there are many instances of use in which the damping material cannot be protected against moisture, water-splash or oil. One such instance, for example, is found in the case of liners between the leaves of vehicle springs. Damping the relative movements between adjacent leaves materially helps the riding qualities of the vehicle and relieves the shock-absorbers of having to do all of the necessary damping work.

For duty such as spring liners, I prefer a combination of the two waxes to either one or the other of them alone. High coefficient of friction is desirable as is also toughness and strength. This would seem, therefore, to call for the first of the above-mentioned waxes alone. Cost, however, is a big item in this instance, as many feet of lining material are required per vehicle spring. Adding the second wax, therefore, in as great proportion as possible and still retaining sufficient strength and coefficient of friction makes a more acceptable product. Also the introduction of the second wax, as stated above, gives a smoother action. In view of the foregoing, I prefer, for this particular duty, a mixture of two parts, by weight of the chlornaphthalene, or first mentioned wax, to one part of the hydroxy stearin, or second mentioned wax. For this spring liner duty, I use strips of paper about .040" thick as a matrix for holding the above 2 to 1 damping, strengthening, and waterproofing compound.

Having thus described the invention and pointed out a few of its uses by way of example, I claim:

1. In combination, two relatively movable spring leaves spaced by a paper matrix uniformly impregnated through its entire thickness with a friction-regulating, waterproofing and toughening compound; said impregnated matrix being wear-resistant and sufficiently yieldable under the pressures imposed to conform closely to the surfaces of the spring leaves and exhibiting frictional properties whereof the static and dynamic coefficients of friction are substantially equalized.

2. In combination, two relatively movable spring leaves spaced by a paper matrix, incorporating kapok fibres, uniformly impregnated through its entire thickness with a friction-regulating, water-proofing and toughening compound; said impregnated matrix being wear-resistant and sufficiently yieldable under the pressures imposed to conform closely to the surfaces of the spring leaves and exhibiting frictional properties whereof the static and dynamic coefficients of friction are substantially equalized.

3. In combination, two frictionally opposed members and means for spacing said members and for smoothing and silencing their relative movements, said means consisting of a composite material comprising a paper matrix uniformly impregnated through its entire thickness with a friction-regulating, water-proofing and toughening compound; said composite material being wear-resistant and sufficiently yieldable under the pressures imposed to conform closely to the surfaces of the opposed members and exhibiting frictional properties whereof the static and dynamic coefficients of friction are substantially equalized.

JOHN WARREN WATSON.